May 30, 1933.  S. M. MADILL  1,912,039
PLOW
Filed Jan. 10, 1931  2 Sheets-Sheet 1

INVENTOR
Stanley M. Madill
BY Brown, Jackson
Boettcher & Dienner
ATTORNEY

WITNESS
Walter Ackerman

May 30, 1933.  S. M. MADILL  1,912,039
PLOW
Filed Jan. 10, 1931   2 Sheets-Sheet 2

WITNESS
Walter Ackerman

INVENTOR
Stanley M. Madill
BY Brown, Jackson
Boettcher & Dienner
ATTORNEY

Patented May 30, 1933

1,912,039

UNITED STATES PATENT OFFICE

STANLEY M. MADILL, OF MOLINE, ILLINOIS, ASSIGNOR TO DEERE & COMPANY, OF MOLINE, ILLINOIS, A CORPORATION OF ILLINOIS

PLOW

Application filed January 10, 1931. Serial No. 507,794.

The present invention relates generally to plows, more specifically to what are known in the art as two-way plows, which is a type of plow comprising two oppositely arranged plowing units, positioned side by side with their land sides next to each other so that they throw the furrow slice in opposite directions. These two units or gangs are arranged to be alternately raised and lowered, and only one of them is in operative position at one time, the other being then raised and held in inoperative position. In using such a plow it is driven back and forth across the field, and each time the field is traversed the furrow slice is taken off the same end of the land.

Generally, the oppositely arranged gangs are mounted on or connected with a wheeled frame of some sort, one side of which is usually adapted to run in a previously made furrow and just forward of the gang which is arranged in operative or plowing position. In this case, unless some adjustment means are provided, the wheeled frame is in a tilted position, due to the fact that the wheel or wheels at one side thereof are lower than the wheel or wheels at the other side.

As a rule, two-way plows are generally arranged so that the oppositely arranged plowing gangs are capable of both lateral and vertical movement. This is for the purpose of permitting the gang in operative position to swing laterally toward the center of the frame so as to move into line with the effective line of draft of the implement. In some constructions there may be a tendency for the gang held in raised or inoperative position to swing toward and interfere with the gang in lowered or operative position. This disadvantageous tendency may also be augmented if the wheeled or supported frame of the implement is tilted laterally by virtue of some of its supporting wheels running in a furrow while the others are running on the land. This tendency for the gangs to interfere may be particularly objectionable where gauge wheels are clamped to the plow beams to prevent the plow bottom from operating beyond a predetermined depth. In such installations it has occasionally been found that the gauge wheels interfere with each other and with the raising and lowering of the plows.

The principal object, therefore, of the present invention is the provision of a novel and improved means associated with the oppositely arranged gangs for effectively holding the raised gang in its lifted or inoperative position from swinging laterally toward the gang in operative position and thereby interfering with its operation.

It is also the object of the present invention to arrange such holding means so as to be automatically put into operation when the gangs are alternately raised to their inoperative position.

Other objects and advantages of the present invention will be apparent to those skilled in the art after a consideration of the following detailed description of the preferred embodiment, taken in conjunction with the accompanying drawings illustrating the same in which.

In order to best illustrate the application of my present invention, I have chosen a two-way plow of the type shown and described in a co-pending application, Serial No. 454,263, filed May 21, 1930 by Carl G. Strandlund and myself, wherein the oppositely arranged gangs are movably connected with a wheeled supporting frame in the nature of a motor driven tractor which may be provided with power actuated means for raising and lowering the gangs. It is to be understood, of course, that the arrangement of the motor driven tractor and the gangs per se forms no part of the present invention and has been chosen only for the purpose of illustrating one application of my present invention. For the particular details of the two-way plow reference may be had to the co-pending application just referred to wherein the novel features are more clearly disclosed and claimed.

Figure 1:
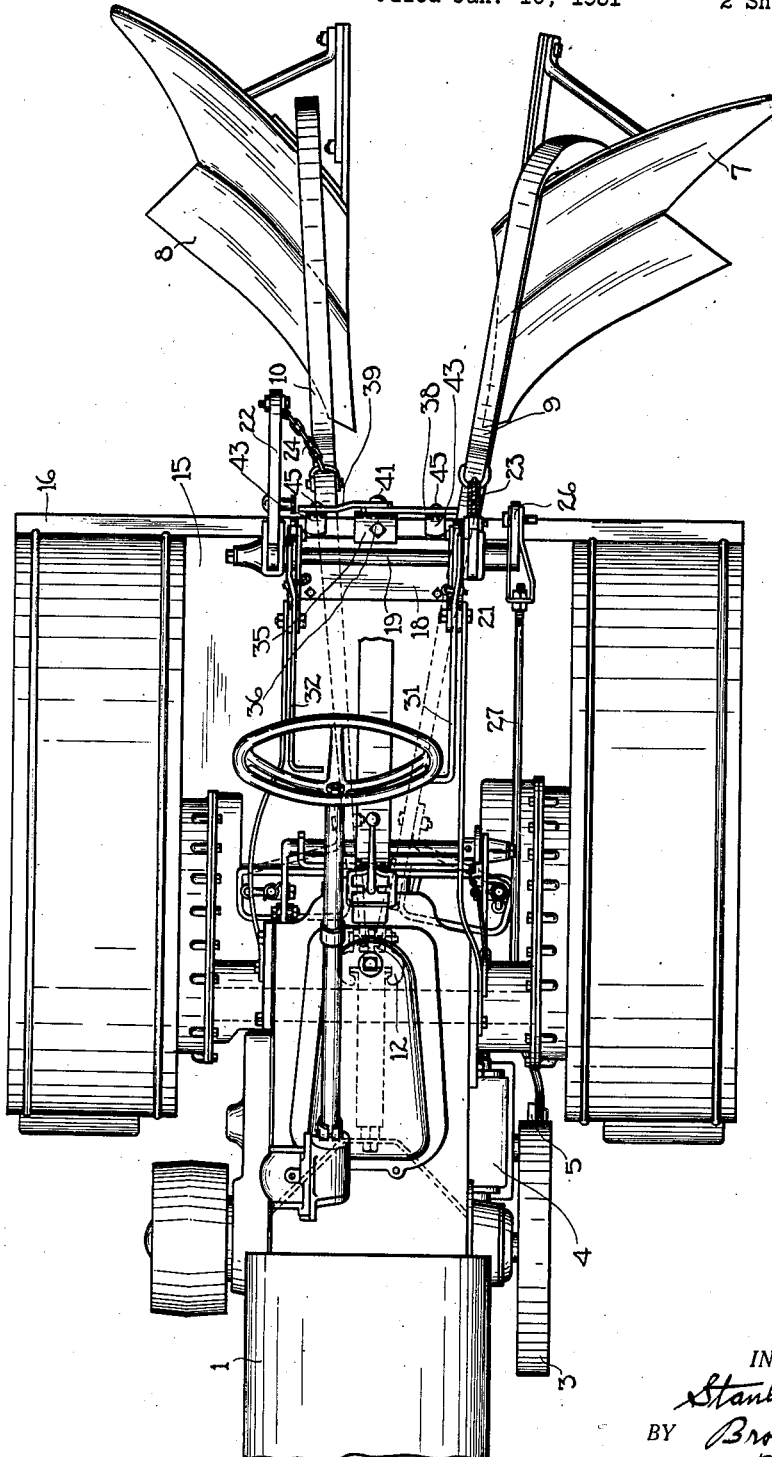
Figure 1 is a top plan view.

Referring now to the drawings, the reference numeral 1 indicates in its entirety a wheeled frame in the form of a tractor having the usual drive wheels 2, a motor indicated by its fly wheel 3, a power lift connection 4 including the usual power lift crank 5 and an operator's station or seat 6. The oppositely arranged plowing gangs are designated by reference numerals 7 and 8 respectively, and each includes a plow beam 9 and 10, the beams being arranged to converge forwardly as best shown in Figure 1 where, at their forwardmost ends, they are connected to a draft transmitting connection indicated in its entirety by the reference numeral 12. The draft connection per se is more specifically disclosed and claimed in the co-pending application referred to above, but it is sufficient to note here that the draft connection 12 is arranged substantially in the fore and aft center line of the implement and the beams 9 and 10 are capable of independent movement both vertically and horizontally with respect to said connection and the wheeled frame.

Before proceeding further to a description of the specific construction shown, it should be explained that in such description the term "gang" will be employed as designating each plowing unit, whether such unit comprises a single beam with its attached furrow opener or plow bottom, such as is illustrated, or a plurality of beams and furrow openers connected together to move in unison.

Lifting means are provided on the wheeled frame or tractor 1 for alternately raising the gangs 7 and 8 to their inoperative position. The plowing units or gangs are lifted out of operative position and into a raised or inoperative position by means of a lifting mechanism mounted on the rear of the wheeled frame tractor 1, preferably on the rear of the platform 15 thereof. This platform generally includes an angle member 16. A bracket 18 is bolted to the platform 15 of the tractor 1 and is provided with upturned portions providing a journal support for a rock shaft 19. By means more specifically described in the above mentioned co-pending application, rocking movement of the rock shaft 19 is operable to swing upwardly either one of the upwardly and rearwardly extending arms 21 and 22. These arms are connected by means of flexible elements 23 and 24, preferably in the form of chains, to the corresponding plow beams 9 and 10. The rock shaft 19 includes a short lifting arm 26 which is connected by means of a link 27 to the power lift crank arm 5 to be actuated thereby. Thus, the power lift mechanism 4 may be actuated to exert an upward swinging movement of either of the arms 21 and 22 to lift the corresponding plow beam to its raised or inoperative position.

For lowering either of the plow beams to its operative position trip mechanisms, indicated as a whole by the reference numerals 31 and 32, are provided. Since the particular structure thereof forms no part of the present invention it is not further described here. For specific details, however, reference may be had to the above mentioned co-pending application wherein such trip mechanism is completely shown and claimed.

Figure 2:
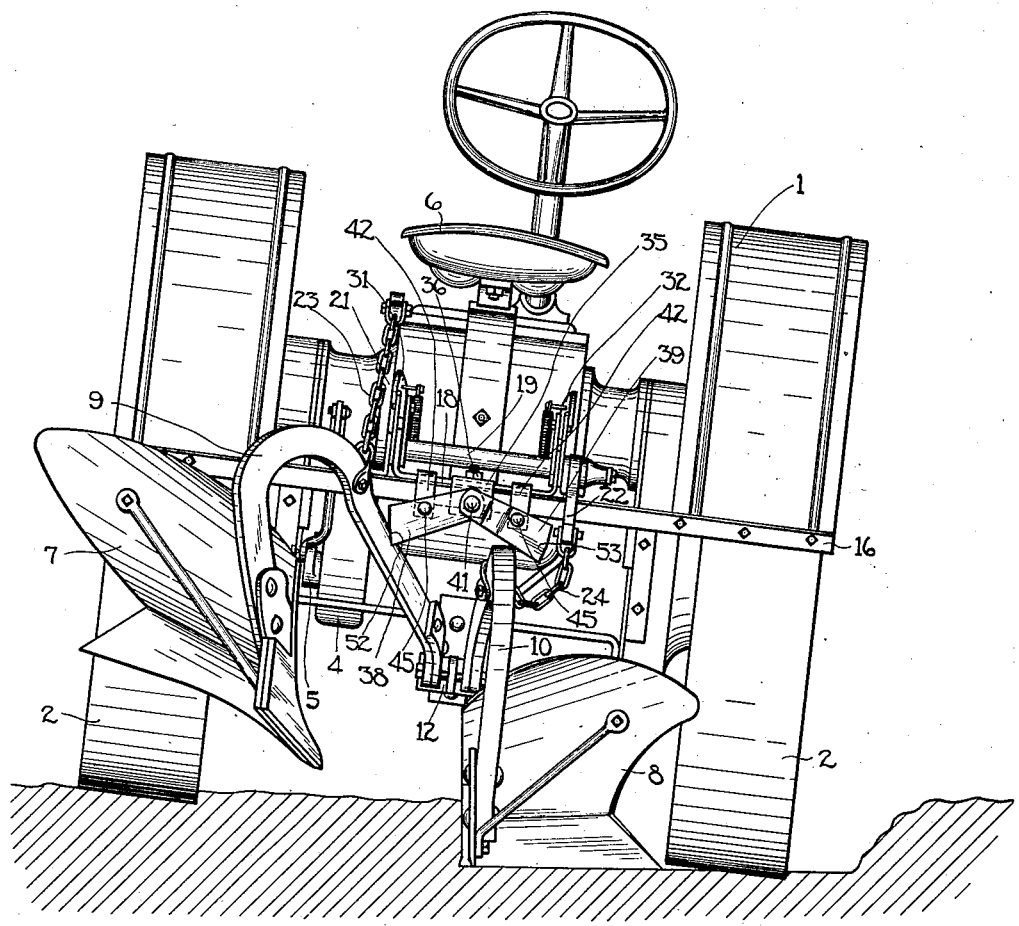
Figure 2 is a vertical rear elevation of the plow shown in Figure 1.

The mechanism comprising means for holding the raised gang in a lateral position where it will not interfere with the operation of the gang in lowered or operative position will now be described. This means is preferably in the nature of an attachment, but as a matter of fact it may, if desired, be embodied as a permanent part of a two-way plow such as the one shown and described herein. The attachment comprises a bracket 35 bolted or otherwise secured to the transverse angle member 16 of the wheeled frame or tractor 1. As shown, a bolt 36 is employed for securing the bracket 35 in place and which therefore allows the bracket 35 together with associated structure to be removed when and if desirable. A pair of arms 38 and 39 are pivotally connected to the vertical leg of the bracket 35, as by means of a pivot stud 41, and these arms, as best shown in Figure 2, extend in opposite direction and laterally with respect to the longitudinal or fore and aft axis of the implement. As shown, the bracket 35 and the pivot axis of the arms 38 and 39 are substantially directly over the draft connection 12 which, as pointed out above, is substantially midway of the implement.

Each of the arms 38 and 39 has secured to it a clip 42 acting as an abutment or projection for limiting the downward pivotal movement of both of the arms. Preferably, the clips 42 have horizontal portions 43 overlying and limited in a downward direction by contact with the angle member 16 or the bracket 18. For securing the clips 42 to the respective arms bolts 45 are provided, although any other equivalent means may be employed for this purpose.

Figure 2 shows that arms 38 and 39 are adapted to cooperate respectively with gangs 7 and 8. In this figure the arm 38 is shown in its position when it is operative to restrain the plow beam 9 from swinging inwardly toward the center line of the implement and toward the gang 8 which is in its operative or furrow opening position. It is to be noted that were it not for the arm 38 the beam 9, held in suspended position by the flexible chain 22, would, due particularly to the tilted position of the wheeled frame 1, swing toward the gang 8 and interfere with the proper operation thereof.

The operation of these arms 38 and 39, which serve as latch means or movable abutment members for the plow beams, is substantially automatic, that is, requiring no particular attention on the part of the operator, as will be more clearly understood from the following modus operandi. Starting with the implement in the position shown in Figure 2, when the operator reaches the end of a furrow and operates the power lift 4 to raise the plow bottom 8 into inoperative or raised position, the tractor being tilted as shown in Figure 2, together with the fact that the normal operating plane of the gang in plowing position is spaced inwardly from the plane of its lifting mechanism, causes the plow bottom 8 to swing outwardly to a position substantially directly below the upper end of the arm 22 in its lifted or upper position. In Figure 2 this upper position of the lifting arm 22 is indicated fragmentarily by the dotted lines to the right and just below the operator's seat 6. The length of the arms 38 and 39 are so dimensioned that, together with the tilted position of the tractor 1, the gang as it is being lifted from its lowered position tends immediately to swing to a position spaced laterally a sufficient amount to clear the end of the associated abutment or latching arm. In being lifted to its non-operating position the beam of the gang being raised may not, however, swing laterally an amount sufficient to clear the abutment arm. For example, when lifting the plow bottom 8 the beam 10 may strike the under side of arm 39 instead of swinging outwardly just beyond the outer end of that arm as is normally the case. Should the beam 10 strike the arm 39, however, the latter will merely be rocked counter-clockwise about the axis defined by the pivot 41 until the end of the arm slips past the beam, whereupon the arm will again rock to its normal position, that is, laterally adjacent the inside edge of the beam 10.

In order to facilitate the arms 38 and 39 slipping past the associated beams 9 and 10 the arms may each be provided with an inclined or cam surface 52 and 53, respectively.

When the operator turns around to start the next furrow the tractor then assumes a level position, and the beam 10 will rest against the right hand end of arm 39, thereby being restrained from any inward movement toward the center of the machine and toward the other gang 7. When the turn is completed and the left hand wheels of the tractor 1 are run into the last completed furrow and the plow bottom 7 is lowered, the tractor tilts to a position opposite to that shown in Figure 2. The arm 39 is effective, however, to hold the beam 10 in its lateral position away from the gang 7 and is thereby prevented from interfering therewith.

While I have shown and described the preferred structural embodiment of the present invention, it is to be understood that my invention is not to be limited to the specific means disclosed, but that, in fact, widely different means may be employed in the practice of the broader aspects of my invention.

What I claim, therefore, and desire to secure by Letters Patent is:

1. A two-way plow comprising a wheeled frame, two oppositely acting rearwardly divergent gangs, said gangs being independently swingable laterally of the frame when in operative position, means on the frame for raising and lowering the gangs, said means being operable to simultaneously or alternately raise the gangs, means on said frame for connecting the forward ends of the gangs directly to the frame, said means being so formed that the gang after being lowered to operative position is adapted to swing laterally inwardly to a position in the line of draft under the force of the forward draft, and means for holding the gang in inoperative position spaced from the gang in operative position.

2. A two-way plow comprising the combination with a tractor of a pair of gangs having their forward ends directly supported on said tractor to support said gangs for free independent universal movement in all directions relative thereto and adapted for alternate operation, means for alternately raising said gangs to inoperative position, and means on the tractor for retaining the inoperative gang in laterally spaced position.

3. An agricultural implement comprising a wheeled frame, oppositely acting gangs, means connecting the gangs with said frame so that each gang may have both vertical and horizontal movement relative to said frame when in operative or inoperative positions, means for alternately raising and lowering one gang relative to the other, said means including a flexible connection whereby when the implement is tipped laterally the gang raised to inoperative position shifts laterally, and means on the frame cooperating with said raised gang to prevent inward swinging thereof.

4. An agricultural implement comprising two oppositely acting plow bottoms normally extending at a forwardly converging angle to each other and adapted to move alternately into operative position, devices for supporting said plow bottoms out of operative position, a draft connection for attaching both of said plow bottoms to a suitable drawing element, said plow bottoms being adapted to swing freely laterally toward and away from one another about said draft connection when in operative position, and latch means operative to prevent the plow bottom in inoperative position from swinging laterally toward the other plow bottom.

5. In combination with a two-way plow having oppositely acting plow bottoms adapted for alternate operation, a tractor for propelling the plow, means on the tractor for alternately raising and lowering the plow bottoms, and means pivotally mounted on the tractor and directly engageable with either plow to prevent one of the plow bottoms from swinging toward the other.

6. The combination with a two-way plow having oppositely acting plow bottoms adapted for alternate operation and a tractor for propelling the plow, of means on the tractor for alternately raising said plow bottoms to inoperative position, and automatically operating means pivoted centrally on the tractor and cooperating with the plow raised to inoperative position to prevent inward swinging of said plow.

7. The combination with a two-way plow having oppositely acting plow bottoms adapted for alternate operation and a tractor for propelling the plow, of means on the tractor for alternately raising said plow bottoms to inoperative position, said means comprising a pair of levers flexibly connected with the plow bottoms and journaled on the tractor to swing in laterally spaced vertical planes, and a pair of abutments on the tractor, each extending outwardly to a point adjacent one of said vertical planes whereby when either of said plow bottoms are raised to inoperative position it will contact with one of said abutments and be prevented from swinging inwardly upon subsequent tilting of the tractor.

8. A two-way plow comprising a wheeled frame, two oppositely acting rearwardly divergent gangs connected with said frames for free lateral movement with respect thereto when in operative position, said gangs being also movable alternately into and out of operative position and arranged at opposite sides of a central normal line of draft, means for alternately raising said gangs to inoperative position, said raising means being spaced from the center line of the wheeled frame, whereby when either gang is raised said gang will swing outwardly, and means on the frame and adapted to contact with either gang to prevent inward swinging thereof relative to said frame when either gang is raised to inoperative position.

9. In a two-way tractor drawn plow having oppositely acting gangs pivoted near their forward ends to the tractor to swing freely laterally when in operative position, means on the tractor for alternately lifting said gangs to inoperative position, said means being spaced outwardly on either side of the pivotal connection of the gangs with the tractor whereby each gang swings outwardly as it is raised, and means on the tractor providing an abutment to prevent inward swinging of the raised gang upon subsequent tilting of the tractor.

10. A two-way plow comprising a wheel-supported frame, plow beams having plow bottoms and pivotally connected with said frame for individual vertical and horizontal swinging movement, lifting means for alternately raising said plow bottoms to inoperative position, the plow bottom in operative position tending to swing into the line of draft and the plow bottom raised to inoperative position tending to swing outwardly of the frame, a pair of oppositely extending arms pivoted to said frame and adapted for movement in a vertical plane transversely of the frame, said arms extending to a point substantially underneath the lifting means whereby to engage the beam of the raised plow bottom and to hold it in its lateral position.

11. An attachment for a two-way plow including a wheeled frame having a pair of pivotally mounted gangs capable of vertical and horizontal swinging movement and lifting means for alternately raising the gangs, said attachment comprising a bracket attachable to said frame and a pair of arms pivoted to the bracket and extending laterally in opposite directions, each arm cooperating with one of said gangs to prevent inward movement of the same when in raised position.

12. An attachment for a two-way plow which comprises a wheeled frame, a pair of pivotally mounted gangs capable of vertical and horizontal movement relative to the frame, means for raising said gangs, said attachment comprising a bracket attachable to said frame, a pair of arms pivoted to the bracket and extending laterally in opposite directions, each arm cooperating with one of said gangs to prevent inward movement of the same when in raised position, and abutment means for limiting the downward movement of each of said arms but permitting the unrestricted upward pivotal movement thereof.

13. An attachment for a two-way plow which comprises a wheeled frame, a pair of pivotally mounted gangs capable of vertical and horizontal movement relative to the frame, means for raising said gangs, said attachment comprising a removable bracket adapted to be attached to the rear of said frame intermediate said gangs, a pair of arms pivoted to the bracket and extending laterally in opposite directions, each arm cooperating with one of said gangs to prevent inward movement of the same when in raised position, and clips secured to the arms and cooperating with the wheeled frame for limiting the downward movement of each of said arms but permitting the unrestricted upward pivotal movement thereof.

14. A two-way plow comprising a wheeled frame one side of which is adapted to run in a previously opened furrow whereby the frame is tilted laterally, a pair of oppositely acting rearward extending gangs pivotally connected with the frame for both horizontal and vertical movement, means on the frame for alternately raising the gangs to inoperative position, said means including arms pivoted on the frame and flexibly connected to each of the gangs, and means made operative by the outward movement of the lowered gang as it is raised from its lowered to its raised position when the frame is tilted in one direction for retaining that gang in a lateral raised position when the plow is reversed and the frame is tilted in the other direction.

15. A two-way plow comprising a wheeled frame one side of which is adapted to run in a previously opened furrow whereby the frame is tilted laterally, a pair of oppositely acting rearwardly divergent gangs pivotally connected with the frame for both horizontal and vertical movement, means on the frame for alternately raising and lowering said gangs, the lowered gang being adapted to swing laterally into the line of draft, said means including arms pivoted on the frame at points spaced laterally of the frame and flexibly connected to each of the gangs, and means made operative by the outward movement of the lowered gang as it is raised from its lowered to its lateral raised position when the frame is tilted in one direction for retaining that gang in its lateral position irrespective of the tilting of the frame in the other direction when the plow is reversed.

16. A two-way plow comprising a wheeled frame one side of which is adapted to run in a previously opened furrow whereby the frame is tilted laterally, a pair of oppositely acting rearwardly divergent gangs pivotally connected with the frame for both horizontal and vertical movement, means on the frame for alternately raising and lowering said gangs, the lowered gang being adapted to swing laterally into the line of draft, said means including arms pivoted on the frame at points spaced laterally of the frame and flexibly connected to each of the gangs, and means made operative by the outward movement of the lowered gang as it is raised from its lowered to its lateral raised position when the frame is tilted in one direction for retaining that gang in its lateral position irrespective of the tilting of the frame in the other direction when the plow is reversed, said means comprising pivoted arms yieldable upwardly when the lowered gang is being raised and is moving to a position in vertical alignment with its raising means.

17. A two-way plow comprising a wheeled frame, two oppositely acting rearwardly divergent gangs, means supported on the frame in offset relation to the line of draft of said gangs and for raising and lowering the same, said means being operable to simultaneously or alternately raise the gangs, a second means connecting the forward ends of the gangs to the frame, said first mentioned means being so formed that the gang lowered to ground engaging position is adapted, under the force of forward draft, to swing freely laterally inwardly into the line of draft, and stop means mounted on said frame independently of the gangs and adapted to abuttingly engage a gang when the latter is in lateral extended position and to restrain inward movement of said gang after it is raised.

18. A two-way plow comprising a wheel supported frame one side of which is adapted to run in a previously made furrow whereby the frame is tilted in that direction, two oppositely acting forwardly converging gangs, a draft connection therefor providing for both vertical and horizontal movement of the gangs independently of the other and freely of the frame in all directions, whereby the gang in operative position may swing freely laterally directly in line with said draft connection and whereby said gang may freely deviate laterally with respect to the draft connection on striking an object, lifting means for alternately raising the gangs to inoperative position, said lifting means comprising members connected with the gangs and mounted on said frame for upward movement in planes respectively spaced outward laterally of said draft connection, and means on the frame for laterally engaging the gangs and adapted to restrain inward movement of the raised gang after it has been raised to a point in vertical alignment with its lifting means.

19. A two-way plow comprising a wheel supported frame one side of which is adapted to run in a previously made furrow whereby the frame is tilted in that direction, two oppositely acting forwardly converging gangs, a draft connection therefor providing for both lateral and horizontal movement of the gangs independently of the other, whereby the gang in operative position may swing directly in line with said draft connection, lifting means for alternately raising the gangs to inoperative position, said lifting means comprising members connected with the gangs and mounted on said frame for upward movement in planes respectively spaced outward laterally of said draft connection, a bracket secured to the frame centrally thereof, an arm having one end pivoted to the bracket and extending laterally to contact with the raised gang to restrain its inward movement when the frame is tilted in the other direction, and means holding the arm in position to engage said gang.

20. A two-way plow comprising, a wheel supported frame, a pair of gangs having their forward ends mounted on said frame for universal movement whereby the rear ends thereof are free to move in all directions, means for alternately or simultaneously raising each of the gangs upwardly and outwardly out of the line of draft from its normal operative position, and cooperative latch means carried by the frame for engaging either of the gangs when raised to hold the same in outwardly spaced relation from its normal operative position and away from the operating gang.

21. A two-way plow comprising two oppositely acting gangs, means for raising and lowering said gangs, each of said gangs having free lateral swinging movement to either side of said plow when in operative position, and means independent of said raising and lowering means for preventing free lateral swinging movement of each gang in one direction after it is raised to inoperative position.

22. A two-way plow comprising a frame, two oppositely acting gangs connected with said frame and movable alternately into operative plowing position, each of said gangs having free lateral swinging movement to either side of said frame when in plowing position, and means on said frame for abuttingly engaging each gang when raised to inoperative position to prevent said raised gang from swinging freely in one direction relative to said frame.

In witness whereof, I hereunto subscribe my name this 7th day of January, 1931.

STANLEY M. MADILL.